United States Patent [19]
Groh et al.

[11] Patent Number: 5,208,884
[45] Date of Patent: May 4, 1993

[54] NEW MULTICOMPATIBLE OPTICAL COUPLER PRODUCED BY INJECTION MOLDING

[75] Inventors: Werner Groh, Lich; Andreas Brockmeyer, Liederbach; Jürgen Theis, Oberursel; Thomas Stehlin, Hofheim am Taunus, all of Fed. Rep. of Germany

[73] Assignee: Hoechst Aktiengesellschaft, Frankfurt am Main, Fed. Rep. of Germany

[21] Appl. No.: 672,948

[22] Filed: Mar. 21, 1991

[30] Foreign Application Priority Data

Mar. 23, 1990 [DE] Fed. Rep. of Germany ....... 4009332

[51] Int. Cl.$^5$ ............................................. G02B 6/26
[52] U.S. Cl. ...................................... 385/46; 385/44; 385/45
[58] Field of Search ................. 350/96.15; 427/222; 385/41-46

[56] References Cited

U.S. PATENT DOCUMENTS

| | | | |
|---|---|---|---|
| 4,039,607 | 8/1977 | Miller | 264/1 |
| 5,019,301 | 5/1991 | Coden et al. | 385/46 X |
| 5,030,321 | 7/1991 | Coutandin et al. | 350/96.15 X |
| 5,041,310 | 8/1991 | Williams et al. | 427/222 |
| 5,046,800 | 9/1991 | Blyler, Jr. et al. | 385/45 X |

FOREIGN PATENT DOCUMENTS

58-149008 9/1983 Japan.
59-154420 9/1984 Japan.

OTHER PUBLICATIONS

Takato, N. and Kurokawa T., "Polymer Waveguide Star Coupler," Applied Optics, vol. 21, No. 11, Jun. 1, 1982.
Yoshizawa, T. and Kawata, T., "Novel Plastic Waveguides for Optical Wave Dividers and Mixers," Plastics in Telecommunications IV, London, pp. 11/1-11/7, Sep. 1986.

Primary Examiner—Akm E. Ullah
Assistant Examiner—Phan Thi Heartney
Attorney, Agent, or Firm—Curtis, Morris & Safford

[57] ABSTRACT

A process for the production of optical couplers from polymers in which the coupler structure is produced by injection molding and the polymers employed are preferably amorphous polymers, in particular PMMA, polystyrenes, polycarbonates, polyolefins, polyesters, polysulfones, polyether sulfones, polyether imides, polyarylates, polyamides or polyester carbonates. The coupler element is solid and may be coated with a polymer which has a lower refractive index than the coupler, so that the light propagation takes place in the coupler itself.

14 Claims, 6 Drawing Sheets

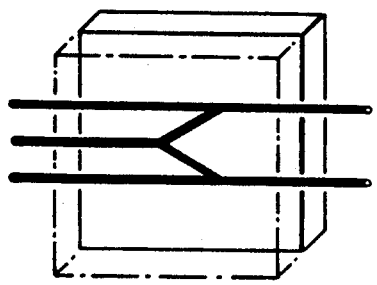
Fig. 1
Fig. 2
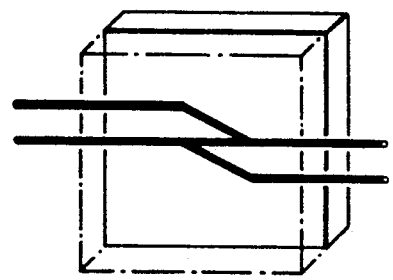
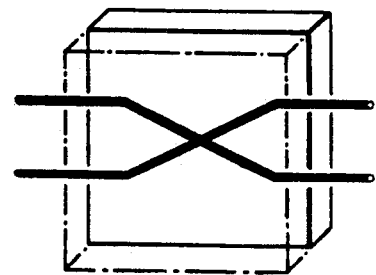
Fig. 3

□ EXPERIMENT
+ THEORY
— "FITTED"

5,208,884

NEW MULTICOMPATIBLE OPTICAL COUPLER PRODUCED BY INJECTION MOLDING

FIELD OF THE INVENTION

The invention relates to a process for the production of optical couplers from polymers.

BACKGROUND OF THE INVENTION

In passive optical waveguide networks, couplers serve as optical components for distributing the light signals from incoming optical waveguides to output optical waveguides. Couplers of this type comprise a transparent element which is connected to optical waveguides on the light-entry and light-exit sides. In addition to couplers produced by bonding or melting transparent moldings together with optical waveguides, couplers are also known which are produced by twisting optical waveguide bundles and stretching them at the twist point (Agarwal, Fiber Integr. Optics 6 (1), 27-53, 1987).

However, the production of composite couplers of this type is complex and expensive; in addition, the transmission attenuation of such known couplers is difficult to reproduce, which means that the performance varies by more than 1 dB between the various output fibers.

Furthermore, couplers are known in which fiber bundles comprising polymeric optical waveguides are melted by means of a shrink tube (DE-A-37 37 930) or optical waveguides are joined at the end faces of a cylindrical mixing zone (R.D. Codd, SAE/IEEE, Internat. Congress of Transportation Electronics, 1984).

A process for deforming an optical waveguide bundle by impression of a die is described in DE-A-39 19 263, which is not a pre-priority publication. The mold and die can be heated here, for example, by warming in a bath.

A further possibility comprises using high-frequency electromagnetic radiation for direct heating of the optical waveguides (DE-A-39 19 263).

The essential disadvantage of all the production methods is the complex process steps, which, as in, for example, the biconical taper process (Agarwal, Fiber Integr. Optics 6 (1), 27-53, 1987), either permit only piece-by-piece manufacture or mean that production automation is only possible using expensive specialized machines.

Furthermore, couplers of this type in which the optical waveguides are joined in the mixing zone always have relatively high optical losses; in addition, couplers produced by the biconical taper process are mechanically unstable.

OBJECTS OF THE INVENTION

The object was to find a process by which mechanically robust star couplers or T couplers (tap) can be produced simply and inexpensively. This production process should not start from ready-made optical waveguides, since the latter must either be freed from the optical cladding in a complex step in the later mixing zone or in which optical losses occur from the very beginning due to joining in the mixing zone as a consequence of the packing density. Furthermore, this method avoids the necessary pre-assembly, which causes higher costs. The process should moreover give couplers having low insertion losses and small variations between the individual output fibers.

SUMMARY OF THE INVENTION

It has now been found that, surprisingly, the above-mentioned requirements can be satisfied if the coupler structure (mixing zone with optical waveguide ends simultaneously) is produced by injection molding.

Optical couplers produced by the process according to the invention are distinguished by high mechanical strength, highly reproducible, low transmission attenuation and, in general, good optical properties, A further advantage of this simple and inexpensive process is the possibility of producing qualitatively high-quality coupler systems by mass production.

BRIEF DESCRIPTION OF THE DRAWINGS

FIGS. 1 through 3 are respectively schematic representations of M-, N-, and X- branching units which may be produced by the process for the production of optical couplers in accordance with the teachings of the present invention.

DETAILED DESCRIPTION OF CERTAIN PREFERRED EMBODIMENTS

Figure 4:
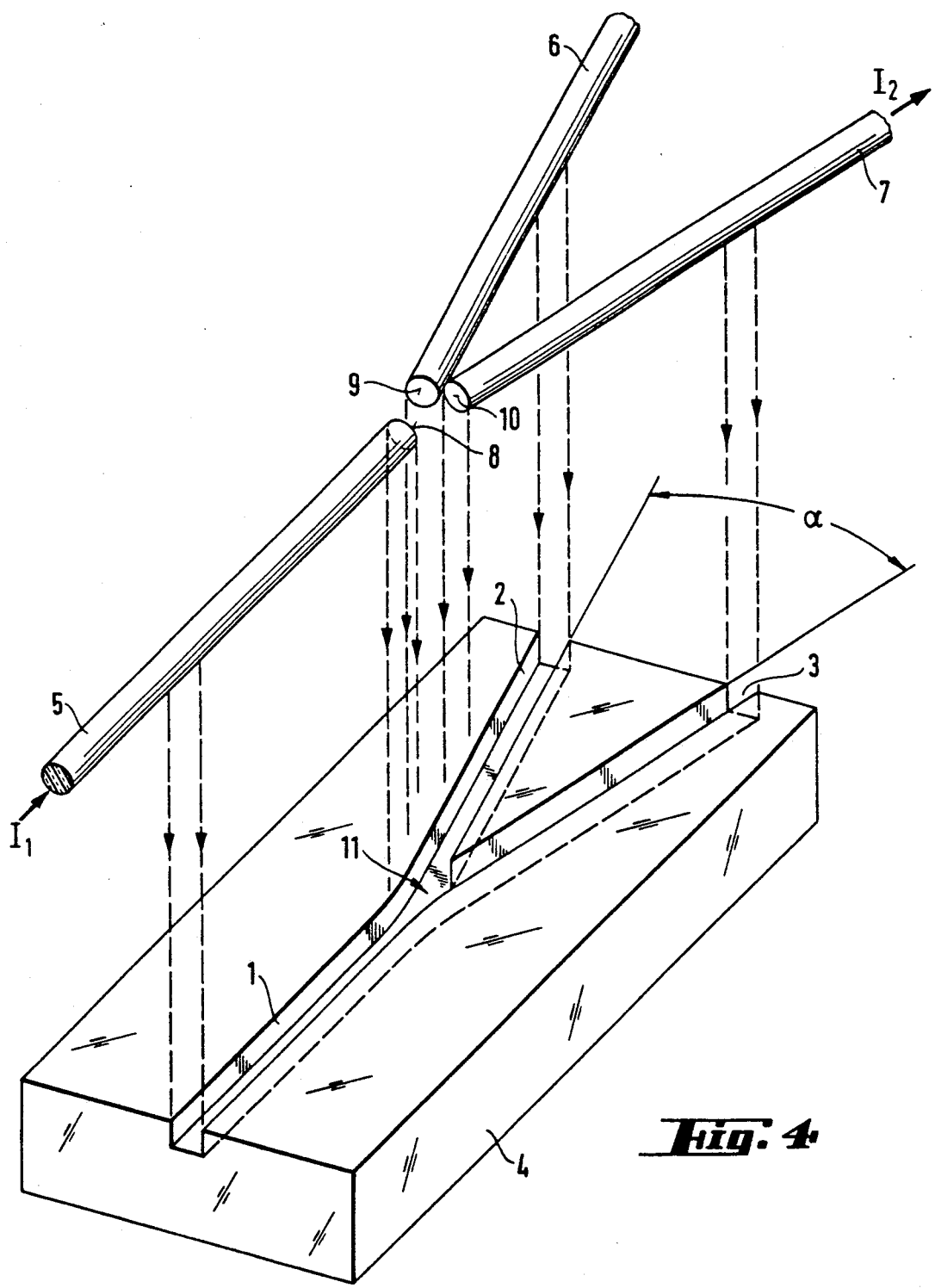
FIG. 4 is an exploded view illustrating a preferred embodiment of the process for producing an optical Y-coupler in accordance with the teachings of the present invention.

The invention thus relates to a process for the production of optical couplers for the construction of optical waveguide systems, which comprises producing the coupler structure by injection molding, in which a hot polymer melt is injected into a pre-fabricated injection mold, which may comprise two or more parts, the melt is allowed to solidify, and the finished coupler element (mixing zone with optical waveguide ends) is subsequently removed.

In principle, any transparent polymer is suitable for the injection-molding of couplers, but, due to the optical losses, preference is given to amorphous polymers, such as, for example, polymethyl methacrylate (PMMA), polystyrene, polycarbonates, polyolefins, polyesters, polysulfones, polyether sulfones, polyether imides, polyarylates, polyamides and polyester carbonates. It is also possible to use copolymers, for example made from methyl methacrylate and pentafluoro-n-propyl methacrylate, or polymer blends, for example PMMA/polyvinylidene fluoride.

However, it is also possible to employ partially crystalline polymers if only slight differences in density exist between the amorphous and crystalline regions, so that the scattering losses which occur are low. An example of a suitable partially crystalline polymer of this type is poly-4-methyl-1-pentene. In general, however, it must be ensured that the molecular weights of the polymers used are suitable for processing by injection molding. Many common polymers, such as, for example, PMMA or polycarbonate, are already available on the market as specific injection-molding grades.

The coupler element according to the invention may be solid and subsequently coated with a polymer which has a lower refractive index than the coupler and thus serves as the cladding, the light propagation taking place in the coupler element itself. In this case, "solid" means that the coupler element contains no cavities, and in this case, as the core material, takes on the task of light propagation. The cladding preferably produced by dipping into a bath containing the appropriate polymer solution, or alternatively by simple spray coating. The choice of cladding material and solvent used depends on the polymer employed for the coupler and on the numerical aperture of the optical waveguides to be connected to the coupler. In order to prevent optical losses, the numerical apertures should match as far as possible.

In a further embodiment, the coupler element can be injection-molded in a single step with the output fibers. In this process, the fibers are placed in the injection mold and encapsulated by injection molding with a polymer with which has the same refractive index as the core material of the fibers. In a preferred case, it is possible to apply the optical cladding in a second step by re-encapsulating the mixing zone by injection molding. The coupler element injection-molded in the first step can, together with the fibers connected thereto, remain in the injection mold, and can, after substantial curing of the polymer forming the mixing zone, be encapsulated by injection molding with a further polymer, which, for the case where the latter serves as the optical cladding, should have a lower refractive index than the first polymer.

It is also possible for the coupler according to the invention to have a channel-like cavity filled with a polymer of higher refractive index, so that the light propagation takes place in the polymer forming the core. The injection-molded channel in this case determines the shape of the coupler and simultaneously acts as the cladding.

The design of the channels (for example choice of length, diameter or cross-sectional shape) and of the mixing zone depends on the future use and can be specified as desired.

Thus, it may be, for example a T coupler with symmetric or asymmetric partition. A preferred embodiment is represented by so-called A×B star couplers, where A is the number of inputs and B is the number of outputs, and A and B are preferably in the range from 1 to 100, in particular in the range from 1 to 16. However, it is also possible to produce other types of branching unit, such as, for example, N, M or X branching units, by the process according to the invention.

These are taken to mean branching elements for specific applications in data transmission and fiber-optical sensor systems.

The construction principle of branching units of this type can be seen from the attached diagrams (FIG. 1=M-branching unit, FIG. 2=N branching unit, FIG. 3=X-branching unit.

The optical waveguides or optical waveguide channels leaving the mixing zone may be linear or curved in the optical coupler according to the invention, it being possible to vary the angle at which the optical waveguides or optical waveguide channels emerge from the mixing zone within broad ranges.

The geometrical shape of the mixing zone is likewise variable and is usually determined by determining the optimum dimensions and angles at which the output channels run by previous experiments on handmade couplers.

It may be particularly advantageous for the mixing zone to have a geometry other than rectangular, for example with a waist-like constriction or elliptical in order to optimize the uniform distribution of the initial intensities, and may, if desired, be embossed in a tooth-like manner or roughened.

Suitable computer programs make it possible to simulate the propagation of light in the coupler and to vary the geometry so that excess losses are minimal and the distribution of the light amongst the exit channels is as uniform as possible.

The length of the optical waveguides or optical waveguide channels is preferably in the range from 10 to 150 mm, and the diameter should be from 0.1 to 3 mm, preferably 0.4–1 mm.

The length of the mixing zone of the coupler according to the invention should expediently be not less than 5 mm and not more than 150 mm. Depending on the area of application, however, it is possible to extend the upper and lower limits.

The cross-section of the optical waveguides leaving the mixing zone can be varied like the shape of the mixing zone; the cross-section of the optical waveguides can generally be selected as desired and in preferred embodiments is circular and/or rectangular, but should be selected so that the surface losses which occur when the optical waveguides are coupled to the mixing zone are minimal.

The injection-molded, coated coupler is provided at the ends with connectors and inserted into a housing to which the optical waveguides are connected. In order to improve the mechanical stability of the coupler, the housing may be cast from a curing silicone or acrylate polymer.

In the process according to the invention, a mold insert or any desired mold is first produced from metal, preferably steel, or stainless steel, which represents the "negative" of the coupler to be produced. Molds which are suitable for the process according to the invention must be produced in high precision and must have only extremely low surface roughness. Thus, the molds can be produced, for example, by electrical discharge machining or wire electrical discharge machining, but in particular by milling out the mold using a computer numeric controlled (CNC) milling machine, followed, in both processes, by polishing. In general, however, any process which ensures high precision can be used. Lithographic methods, such as, for example, the LIGA process of STEAG/Mikrotechnik, are also particularly suitable for the production of injection molds.

The injection molds used for the process according to the invention generally comprise two or more parts, it being possible for devices for injecting the hot polymer melt to additionally be present.

The advantage of the process according to the invention is firstly the possibility of producing qualitatively high-quality coupler systems by mass production, of ensuring good reproducibility and of obtaining coupler systems having generally good optical properties. Secondly, it is possible in this way to produce the mixing zone with the output optical waveguides in a single process step in a simple and inexpensive manner.

The couplers according to the invention can be employed, for example, in fiber-optical sensor systems for illumination or light distribution of the light reflected by a sensor onto various spectral filters and in this way make it possible to evaluate measurement signals, but also to illuminate an object from several sides using a single light source. The optical couplers claimed are particularly suitable for building up optical waveguide networks.

The process according to the invention and the coupler systems produced thereby are illustrated in greater detail with reference to the examples below.

EXAMPLE 1

Figure 5:
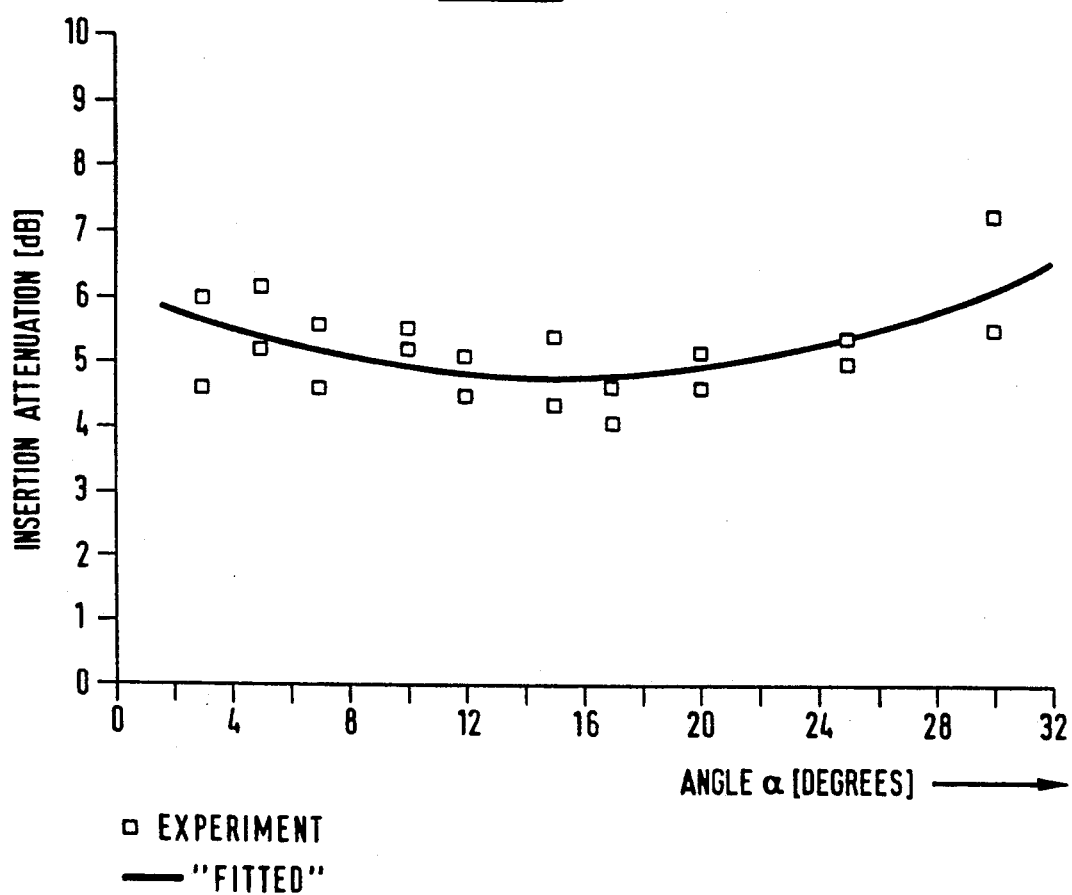
FIG. 5 is a chart illustrating the dependency of the insertion attenuation D on the angle $\alpha$ of the optical Y-coupler of FIG. 4.

The injection mold for a Y coupler was designed by first producing various prototypes by hand in order to optimize the geometry. The construction principle of a Y coupler is represented in FIG. 4. FIG. 5 shows the dependency of the insertion attenuation D on the angle α as a result of the measurements.

$$D = -10 \log \frac{I_2}{I_1}$$

$I_1$ = input intensity of the electromagnetic radiation
$I_2$ = output intensity of the electromagnetic radiation The most favorable angle range is from 10°–20°. In the present example, 15° was assumed as the optimum value.

In accordance with FIG. 4, a profile corresponding to the negative of the mold in FIG. 4 was milled in a steel plate (4) using a CNC machine. This part was then polished mechanically and then used as the injection mold, the counterpiece used being a flat plate, which was removed on demolding.

Using this mold, PMMA blocks (Plexiglas 6N; Röhm) with a thickness of 4 mm, a length of 30 mm and a width of 20 mm were produced. The channels had a square cross-section with an edge length of 1.0 mm. After completion of the blocks, polymer optical waveguides (5, 6, 7) having a diameter of 1.0 mm and whose ends (8, 9, 10) had been prepared in advance using a microtome knife, due to the good optical quality required, were laid in the channels (1), (2) and (3) relatively close to the coupling point (11) (FIG. 4).

The space between the fiber end faces (8, 9, 10) was filled with an optically transparent epoxy resin (EPO-TEK 301-2, $n_D$=1.564). The refractive index of the resin was selected so that the numerical aperture (NA) of the coupling region (11) with PMMA as the optical cladding corresponded to the NA of the polymer optical waveguides (5, 6, 7) laid in the grooves (1, 2, 3).

Finally, a PMMA block was bonded to the coupler as a cover.

The insertion attenuation with the fiber (5) located in channel (1) as the input and the fibers located in the channels (2) and (3) as the outputs was 4.7 dB and 4.9 dB respectively. The difference between them was thus only 0.2 dB.

EXAMPLE 2

Blocks of an amorphous polyolefin (ZEONEX 280; NIPPON ZEON) were injection-molded in accordance with FIG. 4 analogously to Example 1. This material has a refractive index of 1.53. The resin used to fill the channels was epoxy resin EPO-TEK 301-2 ($n_D$=1.564).

The optical waveguides used were commercial polycarbonate fibers (FUJITSU).

The insertion attenuation, measured analogously to Example 1, was 6.2 and 6.3 dB respectively and is partially caused by the lower numerical aperture of the blocks and epoxy resin compared with the polycarbonate fibers.

The advantage of this coupler was, however, the higher temperature resistance of 120° C., while the coupler in Example 1 was resistant only up to 70° C.

EXAMPLE 3

Figure 6:
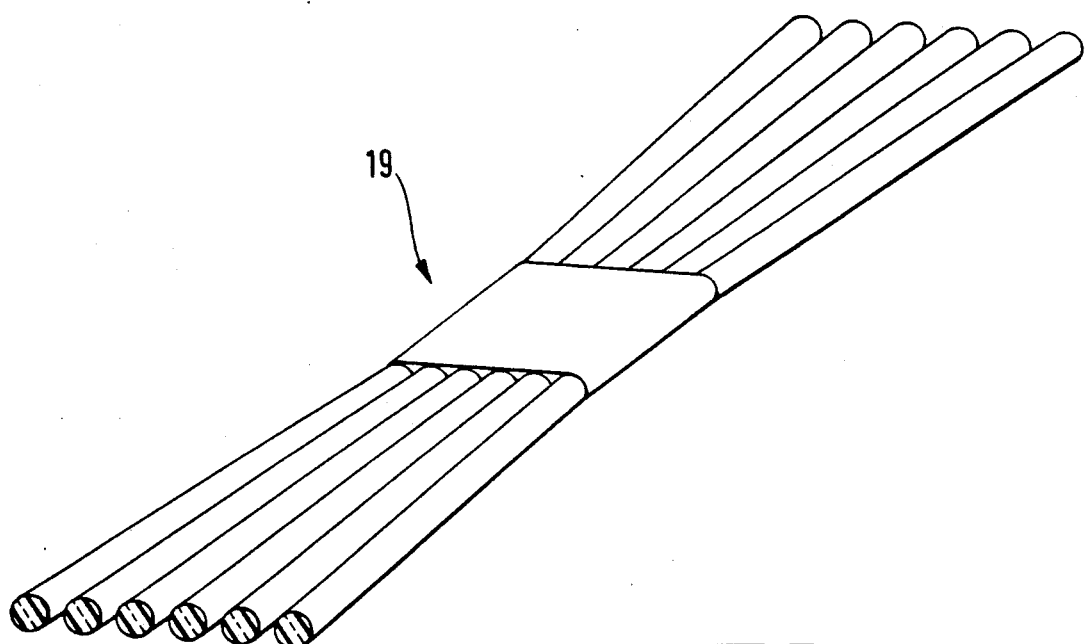
FIG. 6 is a perspective view of a 6×6 star coupler produced in accordance with the teachings of the present invention.

A 6×6 star coupler (19) was produced in accordance with FIG. 6, the geometry having previously been optimized by means of simulation calculations. The most favorable dimensions obtained were the values given in FIG. 6.

Figure 7:
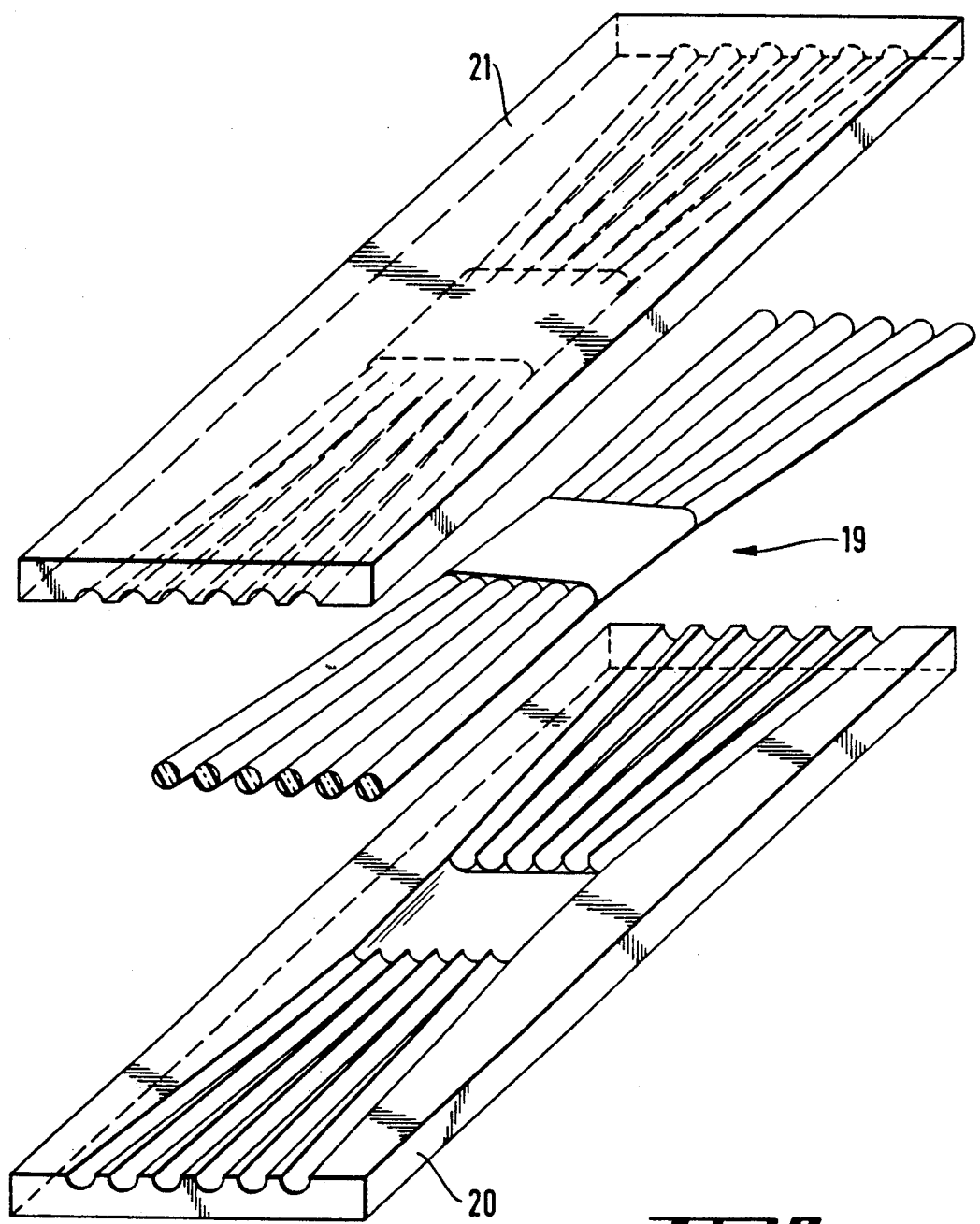
FIG. 7 is a perspective view illustrating the process for producing the 6×6 star coupler of FIG. 6.

The structure of the star coupler was introduced into two steel plates (20; 21) (FIG. 7) by electrical discharge machining.

The mold was subsequently polished. The two plates form the injection mold, into which, in the closed state, the polymer is injected. The two plates are then opened, and the coupler can be removed for the further processing steps.

In the present example, the polymer used was a polycarbonate (MAKROLON CD 2000; BAYER) which was injected at a melt temperature of 300° C. into the mold, preheated to 80° C., from the center of the coupler outward.

The finished component was removed from the mold and conditioned at 100° C. for 10 hours for relaxation of stresses. An optical cladding was then applied by dipping the part into a vessel containing an epoxide clear coating (SICRALAN SL 1000; Gesellschaft für Oberflächentechnik). The coating was cured for 45 minutes at 120° C.

The coating had a refractive index of 1.52 and a temperature resistance of 180° C.

The coupler was employed in a prefabricated housing and provided at the ends with optical waveguide connectors.

For protection against mechanical influences, the housing was cast from a silicone rubber (SilGel 604; WACKER).

The insertion attenuation, averaged over all input and output channels, was 14.5 dB, giving an excess loss of 4–5 dB.

The coupler was distinguished by a high temperature resistance of 120° C.

EXAMPLE 4

Example 3 was repeated replacing the polycarbonate by a polyarylate (DUREL; HOECHST CELANESE). The melt temperature was 315° C. Coating and assembly were carried out as in Example 3.

The mean insertion attenuation measured for the coupler was, at 16 dB, somewhat higher than in Example 3. This is probably attributable to the fact that the polyarylate has a visible yellow coloration which causes higher absorption losses.

EXAMPLE 5

Figure 8:
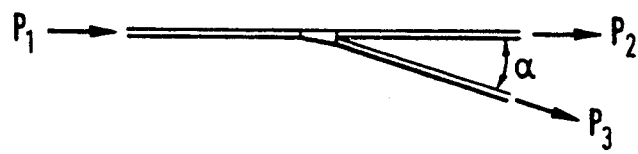
FIG. 8 illustrates a schematic representation of another embodiment of an optical T-coupler produced in accordance with the teachings of the present invention.

A T-coupler (tap) having an asymmetric partition ratio was produced by injection molding. To adjust the partition ratio in accordance with FIG. 8, the angle α between the two output channels is altered.

Figure 9:
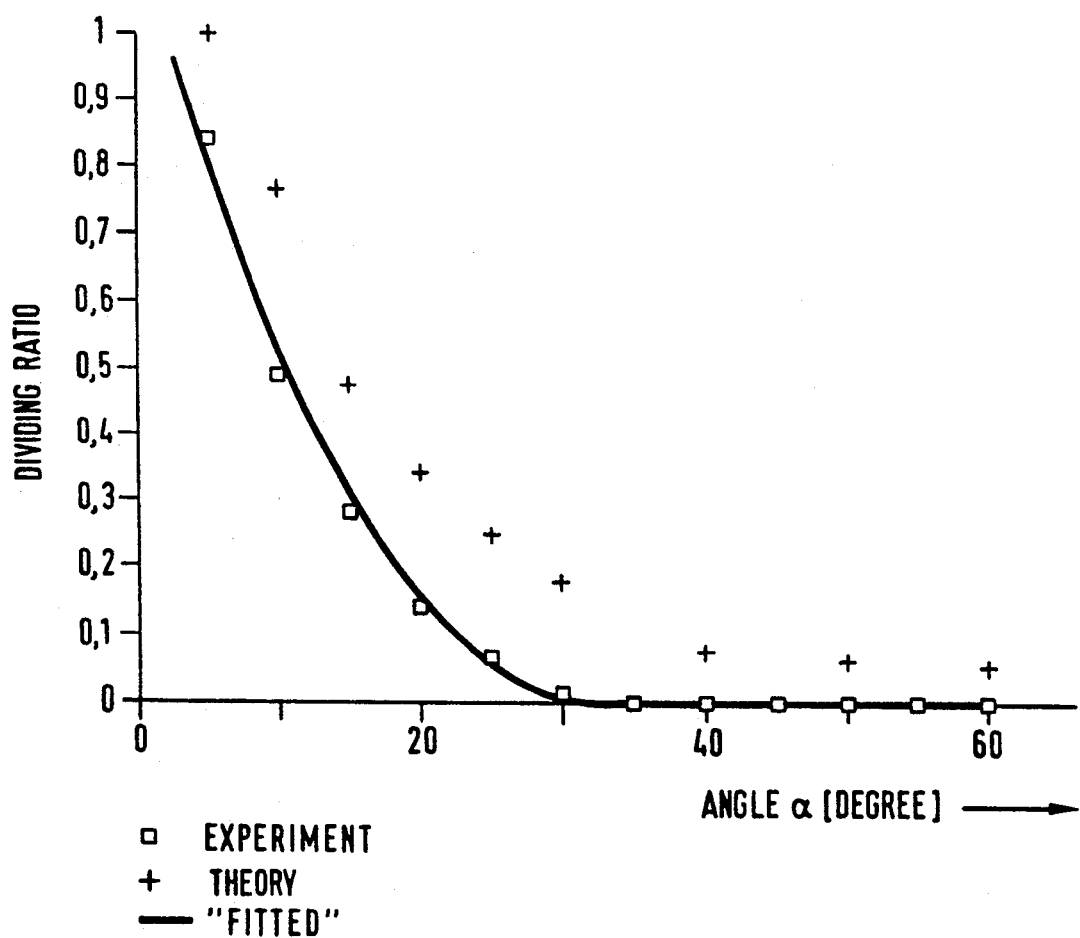
FIG. 9 is a chart illustrating the dependence of the insertion attenuation D on the angle $\alpha$ of the optical T-coupler of FIG. 8.

Simulation calculations and measurements on handmade prototypes gave the dependency shown in FIG. 9.

An angle of 18° C. was chosen for the production of a 1:5 coupler.

The injection mold used was an apparatus analogous to Example 1, the channels now having a width of 1 mm.

The polymer used was a polyether sulfone (ULTRASON E; BASF), which was injected into the mold at 100° C. at a melt temperature of 350° C. The polymer has a refractive index of 1.65.

The injection-molding was conditioned at 180° C. for 24 hours for relaxation of stresses. PMMA optical waveguides (Asahi TB 1000) having a numerical aperture of 0.5 were subsequently laid in the channels, and the channels were filled with epoxy resin (EPO-TEK 301-2). The numerical aperture of the branching region is, at 0.53, well matched to the aperture of the optical waveguide of 0.50.

The cover used was a block of ULTRASON E 1000.

The partition ratio measured for the coupler was 1:4.6, and the insertion attenuation was 3.3 dB.

EXAMPLE 6

A (6×6) star coupler was produced analogously to Example 3, but only the mixing zone was injection-molded.

The injection mold of Example 3 was modified so that it was possible to insert 6 polymer fibers having a length of 6 cm on each side. The fibers employed were polycarbonate fibers having an overall diameter of 1 mm. These 12 polymer fibers were then encapsulated in the closed injection mold by injecting a polymer, so that an optical connection was produced between the fibers.

In the present example, the mixing zone was produced using the polymer Makrolon CD 2000 (BAYER), which was injected at a temperature of about 300° C. into the mold, held at about 80° C., from the center of the coupler outward.

After substantial curing of the mixing zone, a polymer was again injected, and the mixing zone was thus surrounded by a optical cladding.

As the polymer for the optical cladding, polymethyl methacrylate (PMMA/8H; Röhm) was heated to a temperature of about 240° C. and injected into the mold, held at about 80° C., from the center of the coupler outward. The (6×6) star coupler produced with a transmission mixer had an excess loss of 2.4 dB at a maximum performance variation between any desired output fibers of 1.6 dB.

What is claimed is:

1. An optical coupler comprising a mixing zone and optical waveguide ends defining a space therebetween wherein the coupler element including said mixing zone and said optical waveguide ends is produced by forming an injection mole, filling said mold with a first transparent polymer to form a polymeric block, laying a plurality of polymer optical waveguides in channels formed in said polymeric block, filling said space between said optical waveguide ends with a second transparent polymer, and bonding said polymeric block to said coupler element.

2. The optical coupler of claim 1 wherein the refractive index of the transparent polymer filled between said optical waveguide ends is selected so that the numberical aperture of a coupling region formed thereby corresponds to the numerical aperture of said polymer optical waveguides laid in the grooves.

3. An optical coupler as claimed in claim 1, wherein the housing is cast from a curling acrylate polymer in order to improve the mechanical stability.

4. An optical coupler as claimed in claim 1, wherein the optical waveguides are of a predetermined cross-section.

5. An optical coupler as claimed in claim 1, wherein the coupler element is solid and is coated with a polymer which has a lower refractive index than the coupler, and the light propagation takes place in the coupler element itself.

6. An optical coupler as claimed in claim 5, wherein the coupler element is encapsulated by injection molding in a second step with a polymer which has a lower refractive index than the coupler.

7. An optical coupler as claimed in claim 1, wherein the coupler element has a channel-like cavity filled with a polymer of higher refractive index, in which the light propagation takes place.

8. An optical coupler as claimed in claim 1, which is a A×B star coupler, where A is the number in inputs and B is the number of outputs, and A and B are in the range from 1 to 100, preferably in the range from 1 to 16.

9. An optical coupler as claimed in claim 1, which is a T coupler.

10. An optical coupler as claimed in claim 1, wherein the optical coupler is selected from the group consisting of an N, M and X branching unit.

11. An optical coupler as claimed in claim 1, wherein the output optical waveguides and optical waveguide channels are linear and can leave the mixing zone at various angles.

12. An optical coupler as claimed in claim 1, wherein the mixing zone has a geometry other than rectangular, and is embossed in a non-uniform manner.

13. An optical coupler as claimed in claim 1, wherein the length of the optical waveguides and optical waveguide channels is preferably between 10 and 150 mm, and the diameter is between 0.1 and 3 mm, in particular between 0.4 and 1 mm.

14. An optical coupler as claimed in claim 1, wherein the mixing zone has a length of between 5 and 150 mm, preferably between 10 and 40 mm.

* * * * *